United States Patent [19]
Lake

[11] Patent Number: 5,571,570
[45] Date of Patent: Nov. 5, 1996

[54] UV CURABLE BLEND COMPOSITIONS AND PROCESSES

[75] Inventor: Randall T. Lake, Newburgh, Ind.

[73] Assignee: Red Spot Paint and Varnish Co., Inc., Evansville, Ind.

[21] Appl. No.: 486,346

[22] Filed: Jun. 7, 1995

Related U.S. Application Data

[62] Division of Ser. No. 231,895, Apr. 22, 1994.

[51] Int. Cl.$^6$ ...................................................... B05D 3/06
[52] U.S. Cl. ........................... 427/494; 427/495; 427/508; 427/517; 427/518; 427/519; 427/520; 522/90; 522/98
[58] Field of Search ...................... 522/90, 98; 427/494, 427/495, 508, 517, 518, 519, 520

[56] References Cited

U.S. PATENT DOCUMENTS

| | | | |
|---|---|---|---|
| 4,065,587 | 12/1977 | Ting | 427/54 |
| 4,128,600 | 12/1978 | Skinner et al. | 260/859 R |
| 4,287,323 | 1/1981 | Tefertiller et al. | 525/404 |
| 4,393,187 | 7/1983 | Boba et al. | 528/60 |
| 4,511,596 | 4/1985 | Berner | 427/44 |
| 4,717,739 | 1/1988 | Chevreux et al. | 522/79 |
| 4,929,506 | 5/1990 | Kerr, III et al. | 428/412 |

*Primary Examiner*—Shrive Beck
*Assistant Examiner*—Erma Cameron
*Attorney, Agent, or Firm*—Woodard, Emhardt, Naughton Moriarty & McNett

[57] ABSTRACT

An ultraviolet curable blend composition comprising (exclusive of any solvent present): (a) about 35% to about 65% by weight of a first acrylated aliphatic urethane having a molecular weight of between about 500 and 2000 and formed by the reaction of (i) a first multifunctional acrylate with a molecular weight of between about 190 and 500 and containing at least three polymerizable unsaturated groups per molecule, with (ii) an aliphatic urethane based on a polymer of allyl carbomonocycle diisocyanate with alkanepolyol polyacrylates; (b) about 5% to about 25% by weight of a second acrylated aliphatic urethane having a molecular weight of about 1200 to about 2600 and formed by the reaction of a second multifunctional acrylate with a molecular weight of about 110 to about 500 with an aliphatic urethane based on a polyether and having a molecular weight of about 800 to about 2200; (c) about 10% to about 55% by weight of a third multifunctional acrylate having a molecular weight of between about 170 and about 1000 and containing at least two polymerizable unsaturated groups per molecule; and (d) a photopolymerization initiator and/or sensitizer. Also described are preferred processes and coated articles involving preferred compositions.

15 Claims, No Drawings

UV CURABLE BLEND COMPOSITIONS AND PROCESSES

This application is a division of application Ser. No. 08/231,895, filed Apr. 22, 1994.

BACKGROUND OF THE INVENTION

The present invention relates generally to ultraviolet (UV) cured coatings, and more particularly to UV curable coatings which have demonstrated high gloss, improved scratch and abrasion resistance and other properties excellently suited for overlay and other compositions, as well as to processes of their use and to coated articles resulting therefrom.

It is known to the art that conventionally cured coatings have significant disadvantages. In general, the topcoat and the curing agent are applied separately, in a particular sequence and at particular concentration levels. Because both the proportions of the ingredients and the timing of their application is critical, conventionally cured topcoats have been difficult and costly to apply, especially with the efficiency and consistency required in modern commercial applications.

Ultraviolet (UV) cured coatings overcome several disadvantages associated with conventional topcoat finishes. In particular, UV cured topcoats may be premixed so that the polymerization initiator is added to the active ingredients by the manufacturer when the coating is produced, and not by the coating user when the coating is to be applied. Thus, mixing and measurement errors can be avoided and a more consistent product can be obtained.

Despite their many advantages, UV curable coating compositions pose problems which must be addressed. For example, typical UV topcoats are high molecular weight, highly crosslinked films formed from highly reactive acrylate functionality. As such, known UV topcoats have suffered from limited durability, have been prone to cured resin shrinkage, and have required high doses of UV light to cure. UV topcoats formulated to overcome these problems typically suffer from a loss of durability or processibility, including diminished scratch resistance, abrasion resistance, weather resistance, chemical resistance, stain resistance, thermal stability and adhesion.

Also, importantly, known UV topcoats upon curing have long proven to form rigid, unflexible and unyieldable coatings. Thus, problems have been experienced in the industry where topcoat overlaid materials have been subjected to conditions causing expansion or contraction of the product during processing or in the field of use. For example, UV topcoats overlaying dark, e.g. black finishes which expand upon heating have been known to crack, form other imperfections, or even cause bending or warping of the substrate due to tensions built up in the materials.

In light of the foregoing, a need exists for a UV curable composition which is conveniently processible and which forms coatings exhibiting improved physical and chemical properties, e.g., improved flexibility, durability, scratch resistance, abrasion resistance, thermal stability, crack resistance, chemical resistance, stain resistance, weather resistance and adhesion.

SUMMARY OF THE INVENTION

The applicant's invention now addresses these needs and provides in one preferred embodiment a UV curable blend composition comprising: (a) about 35% to about 65% by weight of a first acrylated aliphatic urethane having a molecular weight of about 500 to about 2000 and formed by the reaction of (i) a first multifunctional acrylate with a molecular weight of about 190 to about 500 and containing at least three polymerizable unsaturated groups per molecule, with (ii) an aliphatic urethane based on a polymer of allyl carbomonocycle diisocyanate with alkanepolyol polyacrylates; (b) about 5% to about 25% by weight of a second acrylated aliphatic urethane having a molecular weight of about 1200 to about 2600 and formed by the reaction of a second multifunctional acrylate with a molecular weight of about 110 to about 500 with an aliphatic urethane based on a polyether and having a molecular weight of about 800 to about 2200; (c) about 10% to about 55% by weight of a third multifunctional acrylate having a molecular weight of between about 170 and about 1000 and containing at least two polymerizable unsaturated groups per molecule; and (d) a photopolymerization initiator or sensitizer. The composition can also optionally include a solvent. Unless otherwise specified, percents by weight set forth in this application are calculated exclusive of any solvent present. More preferred compositions can also include suitable light stabilizing agents, e.g., hindered amine and/or benzotriazole derivatives.

Additional preferred embodiments of the invention relate to coated articles and coating processes resulting from and involving the use of applicant's preferred topcoated compositions.

One object of the invention is to provide improved ultraviolet curable compositions demonstrating superior chemical and physical properties such as improved flexibility, durability, thermal stability, crack resistance, chemical resistance, stain resistance, weather resistance and adhesion.

Another object of the invention is to provide processes for coating or overlaying articles, e.g. coated, e.g. painted, or uncoated plastic or metal parts, so as to improve their physical and chemical properties.

Still another object of the present invention is to provide a coated or overlaid article exhibiting superior physical and chemical properties, and especially wherein the topcoat is both flexible to resist cracking or other significant deterioration upon expansion of the article or another coating underlaying the topcoat, and durable to avoid scratching and abrasion of the high gloss surface.

Another object of this invention is to provide coating processes and compositions which enable convenient, consistent and uniform processibility.

Further objects and advantages of the present invention will be apparent from the following description and claims.

DESCRIPTION OF THE PREFERRED EMBODIMENT

For the purposes of promoting an understanding of the principles of the invention, reference will now be made to certain embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, one preferred embodiment of this invention relates to a UV curable composition. In this regard, Formula I, set forth below, shows starting materials and compositional ranges for preferred compositions of the invention. The compositional ranges are given as a percent by weight of the composition excluding any solvent which is included.

| Formula I: | |
|---|---|
| Acrylated aliphatic urethane #1 | (35–65%) |
| Acrylated aliphatic urethane #2 | (5–25%) |
| Multifunctional acrylate | (10–55%) |
| Photopolymerization initiator | (1–15%) |
| Hindered amine light stabilizer | (0.1–7.5%) |
| Hydroxy phenyl benzotriazole | (0.1–7.5%) |
| Antioxidant | (0.1%–3%) |
| Flow additive | (0.1–5%) |

The first acrylated aliphatic urethane according to the present invention contains about 5% to 95% by weight of prereacted multifunctional acrylate and the balance in an aliphatic urethane. More particularly, to obtain the first acrylated aliphatic urethane, a multifunctional acrylate having a molecular weight of about 190 to about 500 and containing at least 3 polymerizable unsaturated groups per molecule (e.g., pentaerythritol triacrylate, diphenyl erythritol tetraacrylate, and trimethylolpropane triacrylate) is prereacted with an aliphatic urethane based on a polymer of allyl carbomonocycle diisocyanate with alkanepolyol polyacrylates. The acrylate having at least three polymerizable groups provides an acrylated aliphatic urethane giving final coatings demonstrating good surface hardness, for example as evidenced by steel wool scratch resistance.

The preferred first acrylated aliphatic urethane has a final molecular weight of about 500 to about 2000. More preferably, the first acrylated aliphatic urethane has a molecular weight of about 800 to about 1000, with a molecular weight of about 800 being most preferred in work to date. These preferred acrylated aliphatic urethanes provide coatings of good weather and thermal crack resistance. Further, these acrylated aliphatic urethanes provide advantageous application solids, curing rates and material compatibility.

The first acrylated aliphatic urethane may be obtained commercially. For example, EBECRYL 8301, available from Radcure Specialties, Inc. of Atlanta, Ga. has been highly preferred as the first acrylated aliphatic urethane in work to date.

Exclusive of any solvent present, as indicated above, the first acrylated aliphatic urethane constitutes about 35% to about 65% by weight of the coating composition. More preferably, this acrylated aliphatic urethane makes up about 40% to about 60% of the composition, most preferably about 45–55%. These preferred levels have provided good weather and thermal crack resistance, as well as advantageous scratch and abrasion resistance, viscosity, material capacity and cure rates.

To obtain the second acrylated aliphatic urethane, a multifunctional acrylate having a molecular weight of between about 110 and about 500 (e.g., 1,6 hexanediol diacrylate, hydroxy ethyl acrylate, and trimethylolpropane triacrylate) is prereacted with an alipahtic urethane based on a polyether and having a molecular weight of about 800 to about 2200 to provide an acrylated aliphatic urethane having a final molecular weight of about 1200 to about 2600. Acrylated aliphatic urethanes having molecular weights of about 1500 to about 2000 are more preferred, with those having a molecular weight of about 1800 being most preferred to date. These preferred acrylated aliphatic urethanes provide coatings of good weather and thermal crack resistance and as well excellent flexibility. Further, these acrylated aliphatic urethanes provide advantageous application solids, curing rates and material compatibility.

Commercially available acrylated aliphatic urethanes may be used for the second urethane as well. For-example, "AB 2010", available from American Biltrite of Lawrenceville, N.J., has been a highly preferred as the second acrylated aliphatic urethane in work to date.

Exclusive of any solvent, as indicated above, the acrylated aliphatic urethane constitutes about 5% to about 25% by weight of the composition. More preferably, this acrylated aliphatic urethane makes up about 10% to about 20% of the composition, with a content of about 15–20% being most preferred. These preferred levels have provided good thermal, crack, scratch and abrasion resistance, as well as advantageous viscosity, material capacity and cure rates.

As will be understood, the particular multifunctional acrylate employed in Formula I will depend upon the desired application viscosity and properties. Typical multifunctional acrylates are of the reactive diluent type, have a molecular weight of about 170 to about 1000, and contain at least two polymerizable unsaturated groups per molecule. Representative multifunctional acrylates thus include ethylene glycol di(meth)acrylate, 1,6-hexanediol diacrylate, pentaerythritol triacrylate, pentaerythritol tetra acrylate, trimethylolpropane triacrylate, tetraethleneglycol diacrylate, and the like, and mixtures thereof, with light-stable materials, e.g. 1,6-hexanediol diacrylate, being more preferred.

The preferred coating composition includes this multifunctional acrylate in an amount of about 10% to about 55% by weight. The range of about 10% to about 40% is more preferred, with about 10%–30% being most preferred in work to date. These preferred levels provide compositions of good compatibility which give coatings of excellent scratch, abrasion, thermal and crack resistance.

As those practice in these areas will appreciate, many photopolymerization initiators and/or sensitizers will be suitable for the invention. These include, for instance, benzophenone, benzion, benzionmethyl ether, benzion-n-butyl ether, benzion-iso-butyl ether, propiophenone, acetophenone, methyphenylgloxylate, 1-hydroxycyclohexyl phenyl ketone, 2,2-diethoxyacetophenone, ethlphenylpyloxylate, phenanthraquinone, and the like, and mixtures thereof. In work thus far, 1-hydroxycyclohexyl phenyl ketone has been more preferred. For additional information on photopolymerization initiators and sensitizers, reference can be made to C. G. Roffey, *Photopolymerization of Surface Coatings*, Chapter 3: "Photo-initiators and photo-sensitizers", John Wiley & Sons Ltd (1982), which is hereby incorporated by reference.

The photopolymerization initiator or sensitizer will be included in an amount sufficient to obtain the desired cure response. In preferred compositions of the invention, the photopolymerization initiator or sensitizer is included in amounts of about 1% to about 15% by weight. The range of about 1% to about 10% is more preferred, with about 5–10% being most preferred so far. As indicated, however, the amount of initiator included will vary based upon many factors such as the cure rate and durability desired.

The composition also preferably includes other materials such as light stabilizers, e.g. suitable hindered amines and/or benzotriazole derivatives. These materials will be included in varying amounts in accordance with the particular use or application desired. When included, their amounts will be sufficient to provide increased weatherability yet still obtain adequate cure response for the composition. In more preferred compositions, hindered amine, hydroxyphenyl benzotriazole (or other suitable benzotriazole compound) and antioxidants have been included in amounts of about 0.1–7.5%, 0.1–7.5% and 0.1–3.0% respectfully, and in particularly preferred compositions about 1.2%, 0.3% and 0.3% respectively.

As stated, the coating composition also optionally includes a suitable inert solvent. Representative such solvents include ester solvents, e.g. ethyl acetate, butyl acetate, and the like, ketone solvents, e.g. acetone, methylisobutylketone, methylethylketone, and the like, alcohols, e.g. butyl alcohol, and the like, and aromatic solvents, e.g. toluene, xylene, and the like. The amount of solvent included will vary in accordance with the particular application at hand. For instance, for spray applications, higher levels of solvent will typically be included, while for roll applications, lower levels of inert solvent, if any, will be employed. In any event, the inert solvent will constitute from 0% to about 95% by weight of the entire coating composition, and in more preferred coating compositions about 40% to 60%.

As will be understood, the composition can also include other conventional additives. For instance, it can contain polymeric or silicone coating surface improvers, flow improvers, dyes, pigments, antioxidants, flatting agents (e.g. wax-coated or non-wax-coated silica or other inorganic materials), etc. In more preferred compositions, flow improver is included at a level of about 0.3–3%, and in one especially preferred composition, the flow improver Byk 301, available from BYK-CHEMIE, of Wallingford, Conn. has been included.

As to its use, the composition can be applied by any conventional coating method as known in the art. For example the composition can be applied directly to the substrate or over another previously-cured (e.g. paints or primers) or uncured (e.g. in the case of tie coats) coating. The material is advantageously used at about 0.3 mils to about 3.0 mils of cured film thickness, with more preferred cured film thicknesses being those around about 1 mil. Preferred thicknesses will provide sufficient film continuity, avoid surface sagging, and promote a satisfactory cure.

Once applied, the coating composition can be cured by irradiation with ultraviolet rays as is known to those skilled in the art. In this regard, the irradiation is continued until curing is complete, with preferred exposure times typically being less than 300 seconds. Curing temperatures can range from room temperature to the heat distortion temperature of the substrate, while curing distances are typically between about 2 and 18 inches from the UV source.

An ultraviolet light source having a wavelength range of between about 1800 Angstroms and 4500 Angstroms is preferred for curing the topcoat. For example, sunlight, mercury lamps, arc lamps, zenon lamps, gallium lamps, and the like may be used, but high pressure or ultrahigh pressure mercury lamps provide particularly advantageous rapid cures.

A high pressure mercury lamp having an intensity of about 30 W/cm to 400 W/cm is preferred, for a total exposure of between about 300 and about 16000 mJ/cm$^2$ as measured by a compact radiometer at 60 to 1200 mW/cm$^2$ and about 75 to about 4000 mJ as measured by a UVIMAP, with a preferred exposure of about 3000 mJ/cm$^2$ as measured by a compact radiometer at 260 mW/cm$^2$ and about 700 mJ as measured by a UVIMAP. These preferred curing processes have provided good through cure, and have ensured advantageous coatings which resist premature yellowing and demonstrate desirable thermal crack resistance. Moreover, these advantageous cures have been achieved over a surprisingly wide range of exposures. Accordingly, the preferred compositions are readily and highly conveniently processable. Previously known UV curable compositions have demonstrated serious deficiencies in this regard, a problem long recognized in the industry leading to increased production costs and wastes of time and materials. Further, the final coatings have the uniquely combined properties of durability, scratch resistance and flexibility, a combination long sought in the coating field.

For the purposes of promoting a further understanding of the invention and its preferred features and advantages, reference will now be made to the following specific examples and tables. It will be understood that these examples and tables are given by way of illustration and are not intended to be restrictive of the invention.

EXAMPLE 1

Preparation of Preferred UV Curable Coating Composition

In order to prepare a UV curable coating composition in accordance with the invention, items 1 and 2 of Formula II below were charged into a clean stainless steel vessel equipped with a stirrer. Thereafter, ingredients 3 through 9 were added under agitation until a clear homogeneous mixture was obtained. This coating composition was called "Topcoat A."

| Formula II: | |
|---|---|
| | Part by weight |
| 1. Isopropanol | 575.1 |
| 2. Butanol | 17.9 |
| 3. 1-Hydroxycyclohexyl phenyl ketone | 26.0 |
| 4. Hindered amine light stabilizer | 5.0 |
| 5. Benzotriazole | 1.0 |
| 6. Antioxidant | 1.0 |
| 7. Acrylated aliphatic urethane #1* | 176.0 |
| 8. Acrylated aliphatic urethane #2** | 78.0 |
| 9. 1,6 Hexanediol diacrylate | 39.0 |
| 10. Trimethylolpropane triacrylate | 78.0 |
| 11. Flow improver (Byk 301) | 3.0 |

*"EBECRYL 8301", based on polymer of alkyl carbomonocycle diisocyanate with alkanepolyol polyacrylate prereacted with an acrylated polyol.
**"AB 2010," based on a polyether aliphatic urethane prereacted with a multifunctional acrylate.

EXAMPLE 2

Production of Topcoated Plastic Molded Article

The above-described Topcoat A was applied to polycarbonate resin lenses by spray to allow 23 microns of cured coating thickness. Thereafter, the material was irradiated with a high pressure mercury lamp of 120 W/cm$^2$, with the substrate positioned eight inches from the light source for an exposure of 3000 mJ/cm$^2$ in air.

The thus obtained topcoated polycarbonate resin lens had a clear appearance. The product was evaluated by exterior decorative standards, and superior results were obtained as set forth in Table 1.

TABLE 1

| Evaluated Item | Evaluated Method | Results |
|---|---|---|
| Scratch Resistance | 0000 Steel Wool Rubs | Passable |
| Adhesion | Peel Test ASTM | No loss |
| Abrasion Resistance | Taber Abrader, CS-10, | Passable |

TABLE 1-continued

| Evaluated Item | Evaluated Method | Results |
| --- | --- | --- |
| Water Resistance | 500 g load, 300 cycles 32 degrees Centigrade, 240 hour immersion | Passable, Secondary adhesion OK |
| Thermal Shock Resist. | 4 hrs. water immersion 4 hrs. −29° C. Steam blast on scribe | Passable |
| Heat Resistance | 132° C., 2 hrs. | No cracks |
| Resistance to Water & Soap Spotting | Discoloration | Passable |
| Resist. to Acid Spots | No dulling/color change | Passable |
| Chemical Resistance | Motor Oil, Tar remover Windshield Wiper Fluid Antifreeze, Motol Fuel | Passable |
| Weather Resistance | EMMA (QUE) 925 MJ, 3.5 years equivalence | Passable |
| Weather Resistance | Florida exposure 12 months, 45 degrees South | Passable |

EXAMPLE 3

Comparative Coating Material #1

The overlay was prepared in the same manner as Topcoat A in Example 1 except the first acrylated aliphatic urethane was replaced with one of a molecular weight of 2279 and labeled "Topcoat B."

EXAMPLE 4

Comparative Coated Article #1

Topcoat B was applied and cured as was topcoat A in Example 2. The resultant product was evaluated by the same conditions as in Example 2, and produced the following results:

TABLE 2

| Evaluated Item | Results of Evaluation |
| --- | --- |
| Scratch Resistance | Noticeable Scratches |
| Adhesion | No loss |
| Abrasion Resistance | Unacceptable |
| Water Resistance | Passable Secondary adhesion OK |
| Thermal Shock Resistance | Passable |
| Heat Resistance | Acceptable |
| Resistance to Water & Soap Spotting | Passable |
| Resistance to Acid Spotting | Passable |
| Chemical Resistance | Passable |
| Weather Resistance | Passable |

EXAMPLE 5

Comparative Coating Material #2

The overlay was prepared in the same manner as Topcoat A in Example 1 except the second acrylated aliphatic urethane was replaced with one of a molecular weight of 1700 (non-polyether type) and labeled "Topcoat C."

EXAMPLE 6

Comparative Coated Article #2

Topcoat C was applied and cured as was topcoat A in Example 2. The resultant product was evaluated by the same conditions as in Example 2, and produced the following results:

TABLE 3

| Evaluation | Results of Evaluation |
| --- | --- |
| Scratch Resistance | Noticeable Scratches |
| Adhesion | No loss |
| Abrasion Resistance | Unacceptable |
| Water Resistance | Passable Secondary adhesion OK |
| Thermal Shock Resistance | Passable |
| Heat Resistance | Unacceptable |
| Resistance to Water & Soap Spotting | Passable |
| Resistance to Acid Spotting | Passable |
| Chemical Resistance | Passable |
| Weather Resistance | Passable |

It was thus demonstrated that the coating compositions of the present invention possess improved physical and chemical properties.

It should be understood that many changes or modifications can be made to adapt the invention to a particular use without changing its basic features. Therefore, while the invention has been described in detail in the foregoing examples and descriptions, the same are to be considered illustrative and not restrictive in character. It is to be understood that preferred embodiments have been described in the preceding examples, and that all changes and modifications that come within the spirit of the invention are desired to be protected.

What is claimed is:

1. A method for forming a coating on an article, comprising the steps of:
   (a) applying to the article an ultraviolet curable coating composition including, exclusive of any solvent present:
   about 35% to about 65% by weight of a first acrylated aliphatic urethane having a number average molecular weight of between about 500 and 2000 and formed by the reaction of
      (i) a first acrylate having multiple acrylate functionalities with a molecular weight of about 190 to about 500 and containing at least three polymerizable unsaturated groups per molecule, with
      (ii) an aliphatic urethane based on a polymer of alkyl carbomonocycle diisocyanate with alkanepolyol polyacrylates;
   about 5% to about 25% by weight of a second acrylated aliphatic urethane having a number average molecular weight of between about 1200 and 2600 and formed by the reaction of
      (i) a second acrylate with multiple acrylate functionalities with a molecular weight of about 110 to about 500 , with
      (ii) an aliphatic polyether urethane having a molecular weight of about 800 to about 2200;
   about 10% to about 55% by weight of a third acrylate having multiple acrylate functionalities and a molecular weight of about 170 to about 1,000 and containing at least two polymerizable unsaturated groups per molecule; and a photopolymerization initiator or sensitizer; and, (b) irradiating and thereby curing the applied composition with ultraviolet light.

2. A method according to claim 1 wherein said ultraviolet curable composition further comprises a solvent, and a hindered amine and a benzotriazole light stabilizer.

3. A method according to claim 2 wherein said benzotriazole light stabilizer is hydroxy phenyl benzotriazole.

4. A method according to claim 2 wherein:

exclusive of said solvent, said curable composition is comprised about 40% to about 60% by weight of said first acrylated aliphatic urethane, about 10% to about 20% by weight of said second acrylated aliphatic urethane, and about 10% to about 30% of said third multifunctional acrylate.

5. A method according to claim 4, wherein said first acrylated aliphatic urethane has a molecular weight of about 800 to about 1000.

6. A method according to claim 3, wherein said first acrylated aliphatic urethane has about six polymerizable acrylate groups per molecule.

7. A method according to claim 4, wherein said second acrylated aliphatic urethane has a molecular weight of about 1500 to about 2000.

8. A method according to claim 7, wherein said second acrylated aliphatic urethane is AB 2010.

9. A method for forming a plastic molded article having a scratch-resistant topcoat thereon, comprising forming on a plastic molded article a topcoat of an ultraviolet light-cured composition including a blend of an acrylated aliphatic polyester urethane having a number average molecular weight between about 500 and 2000 and a functionality of about 6 with an acrylated aliphatic polyether urethane having a number average molecular weight of between about 1200 and 2600 and a functionality of about 2.

10. The method of claim 9 wherein the plastic molded article is a lens formed of polycarbonate resin.

11. A method for forming a coating on an article, comprising the steps of:

(a) applying to the article an ultraviolet curable coating composition including, exclusive of any solvent present:

about 35% to about 65% by weight of a first acrylated aliphatic urethane having a number average molecular weight of between about 500 and 2000 and formed by the reaction of (i) a first acrylate having multiple acrylate functionalities selected from the group consisting of pentaerythritol triacrylate, diphenyl erythritol tetraacrylate, and trimethylolpropane triacrylate, with (ii) an aliphatic urethane based on a polymer of alkyl carbomonocycle diisocyanate with alkanepolyol polyacrylates;

about 5% to about 25% by weight of a second acrylated aliphatic urethane having a number average molecular weight of between about 1200 and 2600 and formed by the reaction of (i) hydroxy ethyl acrylate, with (ii) an aliphatic polyether urethane having a molecular weight of about 800 to about 2200;

about 10% to about 55% by weight of a third multifunctional acrylate having multiple acrylate functionalities and a molecular weight of about 170 to about 1,000 and containing at least two polymerizable unsaturated groups per molecule; and a photopolymerization initiator or sensitizer; and, (b) irradiating and thereby curing the applied composition with ultraviolet light.

12. The method of claim 11 wherein said first acrylate is pentaerythritol triacrylate.

13. The method of claim 11 wherein the first acrylate is trimethylolpropane triacrylate.

14. The method of claim 12 wherein the first acrylated aliphatic urethane has a number average molecular weight of about 800 to about 1000 and about six polymerizable acrylate groups per molecule, and wherein the second acrylated aliphatic urethane has a number average molecular weight of 1500 to about 2000 and about 2 polymerizable acrylate groups per molecule.

15. The method of claim 13 wherein the first acrylated aliphatic urethane has a number average molecular weight of about 800 to about 1000 and about six polymerizable acrylate groups per molecule, and wherein the second acrylated aliphatic urethane has a number average molecular weight of 1500 to about 2000 and about 2 polymerizable acrylate groups per molecule.

* * * * *

UNITED STATES PATENT AND TRADEMARK OFFICE
CERTIFICATE OF CORRECTION

PATENT NO : 5,571,570
DATED : November 5, 1996
INVENTOR : Randall T. Lake

It is certified that error appears in the above-identified patent and that said Letters Patent is hereby corrected as shown below:

In col. 8, line 11, please delete "Evaluation" and insert in lieu thereof --Evaluated Item--.

In col. 9, line 19 (the first line of claim 6), please delete "3" and insert in lieu thereof --5--.

Signed and Sealed this

Second Day of November, 1999

*Attest:*

Q. TODD DICKINSON

*Attesting Officer*  Acting Commissioner of Patents and Trademarks

UNITED STATES PATENT AND TRADEMARK OFFICE
CERTIFICATE OF CORRECTION

PATENT NO. : 5,571,570
DATED : November 5, 1996
INVENTOR(S) : Randall T. Lake

It is certified that error appears in the above-identified patent and that said Letters Patent is hereby corrected as shown below:

ON THE TITLE PAGE:

In item "[62]" on the first page of the patent, and in col. 1, line 5, please insert after "1994" the following: —, which is a continuation of U.S. Serial No. 07/679,755 filed April 3, 1991—.

Signed and Sealed this

Eighteenth Day of April, 2000

Attest:

Q. TODD DICKINSON

*Attesting Officer*     *Director of Patents and Trademarks*